(12) United States Patent
Juzswik

(10) Patent No.: US 6,597,284 B2
(45) Date of Patent: Jul. 22, 2003

(54) VEHICLE COMMUNICATION FOR TIRE SENSOR INITIATION AND VEHICLE KEYLESS ENTRY VIA A SHARED RESOURCE

(75) Inventor: David Leonard Juzswik, Commerce, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/727,251

(22) Filed: Nov. 29, 2000

(65) Prior Publication Data

US 2002/0063623 A1 May 30, 2002

(51) Int. Cl.⁷ .............................................. B60C 23/00
(52) U.S. Cl. .................. 340/442; 340/447; 340/825.72; 340/10.1; 340/10.2; 340/5.61
(58) Field of Search ................................. 340/442, 447, 340/438, 825.34, 825.54, 825.69, 825.72, 5.61, 10.1, 10.2

(56) References Cited

U.S. PATENT DOCUMENTS

| | | | |
|---|---|---|---|
| 4,811,013 A | | 3/1989 | Akutsu |
| 4,942,393 A | | 7/1990 | Waraksa et al. |
| 5,301,553 A | | 4/1994 | Schultz et al. ................ 73/705 |
| 5,319,364 A | | 6/1994 | Waraksa et al. |
| 5,463,374 A | | 10/1995 | Mendez et al. ............. 340/442 |
| 5,552,641 A | | 9/1996 | Fischer et al. |
| 5,552,789 A | * | 9/1996 | Schuermann .......... 340/825.31 |
| 5,661,651 A | * | 8/1997 | Geschke et al. ............ 340/442 |
| 5,682,135 A | | 10/1997 | Labonde |
| 5,774,047 A | | 6/1998 | Hensel, IV |
| 5,790,016 A | | 8/1998 | Konchin et al. |
| 5,838,229 A | * | 11/1998 | Robinson, III .............. 340/442 |
| 5,880,363 A | | 3/1999 | Meyer et al. |
| 5,924,055 A | | 7/1999 | Hattori |
| 6,259,362 B1 | * | 7/2001 | Lin ............................ 340/457 |

OTHER PUBLICATIONS

Pending U.S. Steiner patent application Ser. No. 09/300,415, filed Apr. 27, 1999 entitled System and Method for Automatic Vehicle Unlock Initiated via Beam Interruption.
Pending U.S. Juzswik patent application Ser. No. 09/687, 709, filed Oct. 13, 2000 entitled Vehicle–Controlled Tire Condition Sensor Communication Utilizing Fixed Tire Identification.
Pending U.S. DeZorzi patent application Ser. No. 09/711, 588, filed Nov. 14, 2000 entitled Tire Condition Sensor Communication with Duty–Cycled Amplified Tire–Side Reception.
Brochure from AVCO Precision Products Division, entitled "TYRECHEK Low Tire Pressure Monitoring & Warning System", and having a lithography ID 473.
An internet press release form Siemens Automotive dated Jan. 24, 2001.

* cited by examiner

Primary Examiner—Daniel J. Wu
Assistant Examiner—Hung Nguyen
(74) Attorney, Agent, or Firm—Tarolli, Sundheim, Covell & Tummino L.L.P.

(57) ABSTRACT

A communication system (10) for a vehicle (12) includes a portable identification device (32) for keyless entry into the vehicle (12) and a tire sensor device (e.g., 48A) for providing information regarding a condition at a tire (e.g., 46A) of the vehicle (12). The portable identification device (32) includes an antenna (110) for receiving an interrogation signal (36) and for transmitting an identification indicative signal (38) responsive to the interrogation signal. The tire sensor device (48A) includes a sensor (158) for sensing at least one tire condition. The tire sensor device (48A) includes antennas (148 and 172) for receiving an initiation signal (e.g., 66A) and for transmitting a condition indicative signal (e.g., 50A) responsive to the initiation signal. The system (10) includes a transmitter arrangement (e.g., 72A, 28A, and 64A) for I emitting the interrogation signal (36) at a first frequency and the initiation signal (66A) at a second, different frequency.

12 Claims, 3 Drawing Sheets

VEHICLE COMMUNICATION FOR TIRE SENSOR INITIATION AND VEHICLE KEYLESS ENTRY VIA A SHARED RESOURCE

TECHNICAL FIELD

The present invention relates to a tire condition monitoring system for providing tire operation parameter information, such as tire inflation pressure, to a vehicle operator, and also relates to a vehicle keyless entry system, such as a passive keyless entry system for unlocking a vehicle door. The present invention relates specifically to a low-cost vehicle communication system that provides ready identification of a tire associated with the provision of condition information and avoids misidentification regardless of previous tire position change due to tire position rotation or the like.

BACKGROUND OF THE INVENTION

Numerous tire condition monitoring systems have been developed in order to provide tire operation information to a vehicle operator. One example type of a tire condition monitoring system is a tire pressure monitoring system that detects when air pressure within a tire drops below a predetermined threshold pressure value.

There is an increasing need for the use of tire pressure monitoring systems due to the increasing use of "run-flat" tires for vehicles such as automobiles. A run-flat tire enables a vehicle to travel an extended distance after significant loss of air pressure within that tire. However, a vehicle operator may have difficulty recognizing the significant loss of air pressure within the tire because the loss of air pressure may cause little change in vehicle handling and little change in the visual appearance of the tire.

Typically, a tire pressure monitoring system includes a pressure sensing device, such as a pressure switch, an internal power source, and a communications link that provides the tire pressure information from a location at each tire to a central receiver. The central receiver is typically connected to an indicator or display located on a vehicle instrument panel.

The communications link between each tire and the central receiver is often a wireless link. In particular, radio frequency signals are utilized to transmit information from each of the tires to the central receiver. However, in order for the central receiver to be able to proper associate/identify received tire pressure information with the tire associated with the transmission, some form of identification of the origin of the signal must be utilized. A need for identification of the origin of the transmitted tire information signal becomes especially important subsequent to a tire position change, such as tire position rotation during routine maintenance.

One approach to identifying the origin of the transmitted tire information signal is to establish a communication link from the central receiver that controls or associates an identity with the transmissions from tires. Hardware components are needed that are capable of accomplishing such functions.

Passive or keyless vehicle entry systems are known. Such systems permit automatic unlocking of a vehicle door, or the like, for an authorized person wishing to gain entry into the vehicle. Specifically, the authorized person does not need to manually turn a key in a vehicle lock, manually actuate a hand-held transmitter, or manually input a code onto a vehicle touch pad.

A passive system includes an identification transceiver carried on the authorized person and a base transceiver located at the vehicle. The base transceiver interrogates the identification transceiver, and in response to the interrogation, the identification transceiver outputs a signal that conveys an appropriate identification or security code. In response to reception of the signal conveying the security code, the base transceiver unlocks the vehicle door. Thus, the authorized person may simply operate a door handle and open the door. Such systems are often referred to as contactless identification and authentication systems.

SUMMARY OF THE INVENTION

In accordance with one aspect, the present invention provides a communication system for a vehicle. The system includes a portable identification device for keyless entry into the vehicle. The portable identification device includes means for receiving an interrogation signal and means for transmitting an identification indicative signal responsive to the interrogation signal. The system includes a tire sensor device for providing information regarding a condition at a tire of the vehicle. The tire sensor device includes means for sensing at least one tire condition, means for receiving an initiation signal, and means for transmitting a condition indicative signal responsive to the initiation signal. The system includes a transmitter arrangement for emitting the interrogation signal at a first frequency and the initiation signal at a second, different frequency. The transmitter arrangement includes at least one component that is operable for provision of both the interrogation signal at the first frequency and the initiation signal at the second frequency.

In accordance with another aspect, the present invention provides a communication method for a vehicle. At least one component is operated for transmission of an interrogation signal at a first frequency. The interrogation signal is received at a portable identification device for keyless entry into the vehicle. An identification indicative signal is transmitted from the portable identification device responsive to the interrogation signal. The at least one component is operated for transmission of an initiation signal at a second, different frequency. The initiation signal is received at a tire condition sensor device. A condition indicative signal, which is indicative of at least one sensed tire condition, is transmitted from the tire condition sensor device responsive to the initiation signal.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXAMPLE EMBODIMENT

Figure 1:
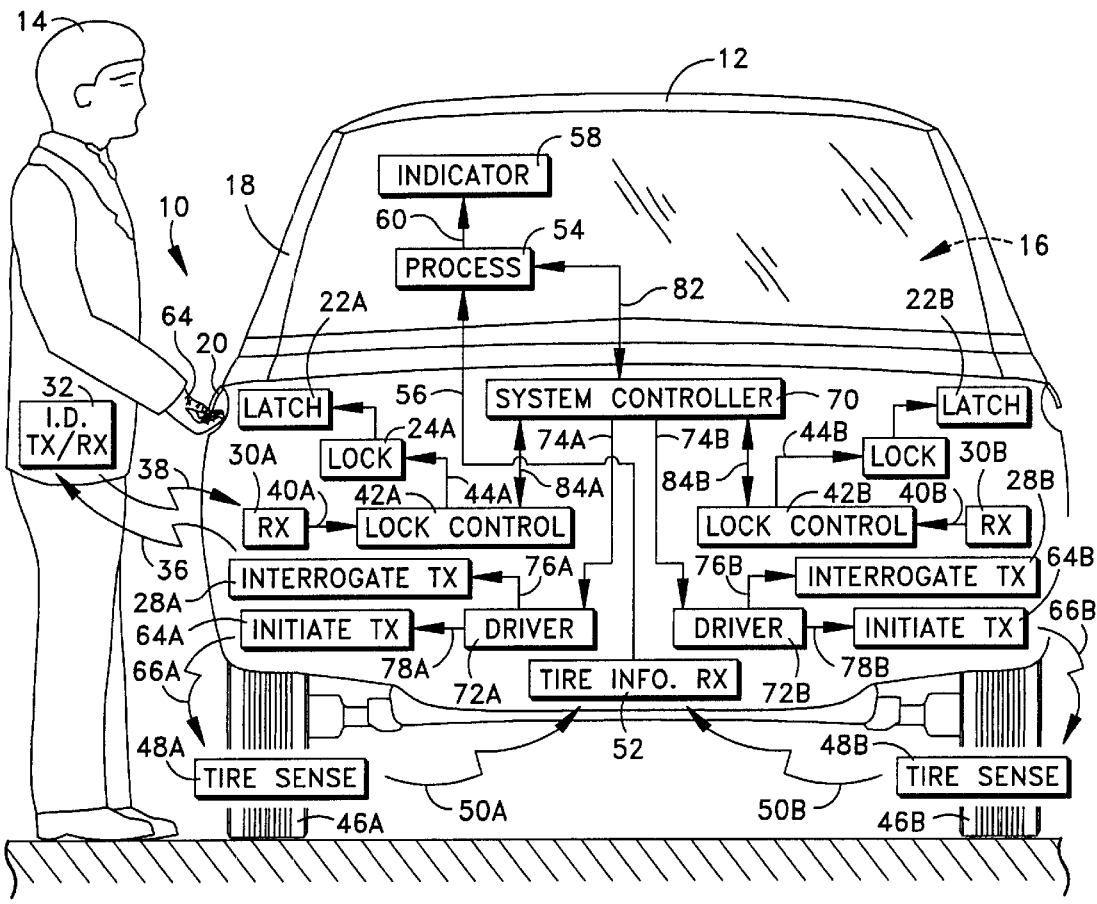
FIG. 1 is an illustration of an authorized person and a vehicle with a function block diagram of an associated vehicle communication system in accordance with the present invention.

A communication system 10, in accordance with the present invention, along with an associated vehicle 12 and an authorized person 14 are shown in FIG. 1. The communication system 10 provides for vehicle entry control and tire condition information conveyance. Specifically, the communication system 10 includes components that comprise an interrogation arrangement for permitting access for the authorized person 14 through a vehicle entranceway, and the system includes components that comprise an arrangement for conveying information regarding a sensed tire condition to apprise a vehicle operator (e.g., the person 14) of the sensed condition.

It is to be noted that the illustrated example of the communication system 10 includes other components that permit access through other vehicle entranceway(s) and that convey other sensed tire condition(s). Herein, identical components are identified with identical reference numerals, but with different alphabetic suffixes. It is to be understood that provided descriptions are generally applicable to the identical components. Also, it is to be understood that the illustrated example that permits access through plural vehicle entranceways and that conveys plural sensed tire conditions is not to be construed as limiting the scope of the present invention.

Turning to the specifics that are associated with a description needed to understand the present invention, the vehicle 12 includes an interior 16 that is enclosed by at least one access door 18. The door 18 is movable and has a handle 20 that is manually actuatable by the person 14 to cause actuation of a latch mechanism 22A. Latch mechanism actuation releases the door 18 to open, such that the person 14 may gain entrance into the interior 16 of the vehicle 12. In broad terms, the door 18 is an entrance cover that closes an entranceway into the vehicle interior 16. A lock mechanism 24A maintains the latch mechanism 22A in a latched condition and prevents opening of the door 18. The person of ordinary skill in the art will appreciate that the latch mechanism 22A and lock mechanism 24A may have any construction type and configuration.

The above-mentioned interrogation arrangement of the communication system 10 includes components 28A and 30A located at the vehicle 12 and an identification transceiver 32 located on the authorized person 14. The components 28A and 30A, at the vehicle 12, and the identification transceiver 32 engage in an interrogation communication exchange for the identification of the bearer of the identification transceiver as the authorized person 14 who is properly permitted to gain access to the vehicle interior 16. The components 28A and 30A at the vehicle 12 include an interrogation transmit component 28A (e.g., an antenna) that emits an interrogation signal 36 intended for reception by the identification transceiver 32, and an interrogation receive component 30A (e.g., an antenna) that receives a response signal 38 from the identification transceiver. Preferably, the interrogation transmit component 28A and the interrogation receive component 30A are located in close proximity to the door 18.

The identification transceiver 32 may take the form of a button or tag that the authorized person 14 carries in their pocket or purse, or secured to their key chain. The identification transceiver 32 receives the interrogation signal 36, and in response to reception of the interrogation signal, emits the response signal 38. The response signal 38 conveys an appropriate security code, which identifies the bearer of the identification transceiver 32 as the person authorized to enter the vehicle 12.

The interrogation receive component 30A is operatively connected 40A a lock control component 42A. The lock control component 42A is, in turn, operatively connected 44A to the lock mechanism 24A, and controls operation of the lock mechanism. In response to reception of the response signal 38, the lock control component 42A provides a signal to the lock mechanism 24A that causes actuation to an unlock condition. Thus, the authorized person 14 can gain entry to the interior 16 of the vehicle 12 without manually operating any unlock device, such as manually turning a key, manually operating a hand-held transmitter, or manually entering a code on a touch pad at the vehicle, or the like. It is to be appreciated that the interrogation sequence is initiated via any suitable manner. For example, the interrogation sequence may result from timing, proximity sensing, touching the handle, pushing a switch, etc.

Turning to additional structures at the vehicle 12 that needs description to provide for an understanding of the present invention, the vehicle has a plurality of inflatable tires (e.g., 46A and 46B). In the illustration of FIG. 1, two ground-engaging tires 46A and 46B are shown. It is to be appreciated that the vehicle 12 may have any number of tires. In one example, the vehicle 12 includes five tires, with four engaging the ground and one stored as a spare.

As mentioned above, the communication system 10 provides tire condition information to an operator (e.g., the person 14). The communication system 10 includes a plurality of tire condition sensor units (e.g., 48A and 48B) for sensing one or more tire conditions at the vehicle tires (e.g., 46A and 46B). Preferably, the number of tire condition sensor units is equal to the number of tires provided on the vehicle 12.

Focusing on just the one tire condition sensor unit 48A, the sensor unit is associated with the tire 46A in any suitable manner. Preferably, the sensor unit 48A is mounted within the tire 46A. The sensor unit transmits a signal 50A that conveys one or more sensed conditions along with an identification to a vehicle-based receive component 52 (e.g., an antenna).

A process component 54 is operatively connected 56 to the receive component 52, and in turn, an indicator device 58 is operatively connected 60 to the process component. Upon receipt of the transmitted signal 50A, the conveyed sensed tire information is processed and the information is provided to the vehicle operator (e.g., the person 14) via the indicator device 58. In one example, the indicator device 58 is a visual display that is located on an instrument panel of the vehicle 12. Accordingly, the vehicle operator (e.g., the person 14) is apprised of the sensed condition(s) at the tire 46A.

It is to be noted that the sensed condition may be any condition at the tire 46A. For example, the sensed condition may be inflation pressure of the tire 46A, temperature of the tire, motion of the tire, or even a diagnostic condition of the tire condition sensor unit 48A itself.

Preferably, the receive component 52 is a single component that receives signals (e.g., 50A and 50B) from a plurality of tire condition sensor units (e.g., 48A and 48B). In order to control which tire sensor unit (e.g., 48A) is to transmit its signal (e.g., 50A), the communication system 10 includes a plurality of initiate transmit components (e.g., 64A and 64B).

Each initiate transmit component (e.g., 64A) is controllably energized to output an initiation signal (e.g., 66A) that causes an associated one (e.g., 48A) of the tire condition sensor units to respond with its signal (e.g., 50A). In other words, each initiation signal (e.g., 66A) is a request that causes a signal response from the associated tire condition sensor unit (e.g., 48A).

Each initiate transmit component (e.g., 64A) is mounted on the vehicle 12 at a location adjacent to a respective one (e.g., 46A) of the vehicle tires. In one example, each initiate transmit component (e.g., 64A) is mounted within the wheel well associated with the respective tire (e.g., 46A).

In operation, when it is desired to receive sensory information from a certain one of the tire condition sensor units (e.g., 48A), the initiate transmit component (e.g., 64A) associated with that sensor unit is stimulated to output the initiation signal (e.g., 66A). In response to reception of the initiation signal (e.g., 66A), the tire condition sensor unit (e.g., 48A) outputs the response signal (e.g., 50A).

A controller 70 of the communication system 10 controls all of the communication originating from the vehicle 12. Specifically, the system controller 70 controls the output of the interrogation signal 36 and controls the output of the initiation signal (e.g., 66A).

The actual output of the signals 36 and 66A is accomplished via the use of one or more additional shared components (e.g., 72A). The term shared components is directed to the point that interrogation communication for keyless vehicle entry and tire condition monitoring communication has, in the past, been accomplished via separate systems with separate components.

Turning to specifics of the example that illustrates the present invention, a driver component 72A is operative connected 74A to the system controller 70. The driver 72A is also operatively connected 76A to at least one interrogation transmit component (e.g., 28A) and operatively connected 78A to at least one initiate transmit component (e.g., 64A). The system controller 70 is operatively connected 82 to the process component 54 and is operatively connected 84A to the respective lock control component 42A.

When an interrogation signal 36 is to be output, the system controller 70 controls the driver 72 to stimulate the connected interrogation transmit component 28A. When the initiation signal 66A is to be output, the system controller 70 controls the driver 72 to stimulate the connected initiate transmit component 64A. Thus, at least the driver 72 is a shared component for the two types of communication. Further, the system controller 70, itself, is a shared component.

Figure 2:
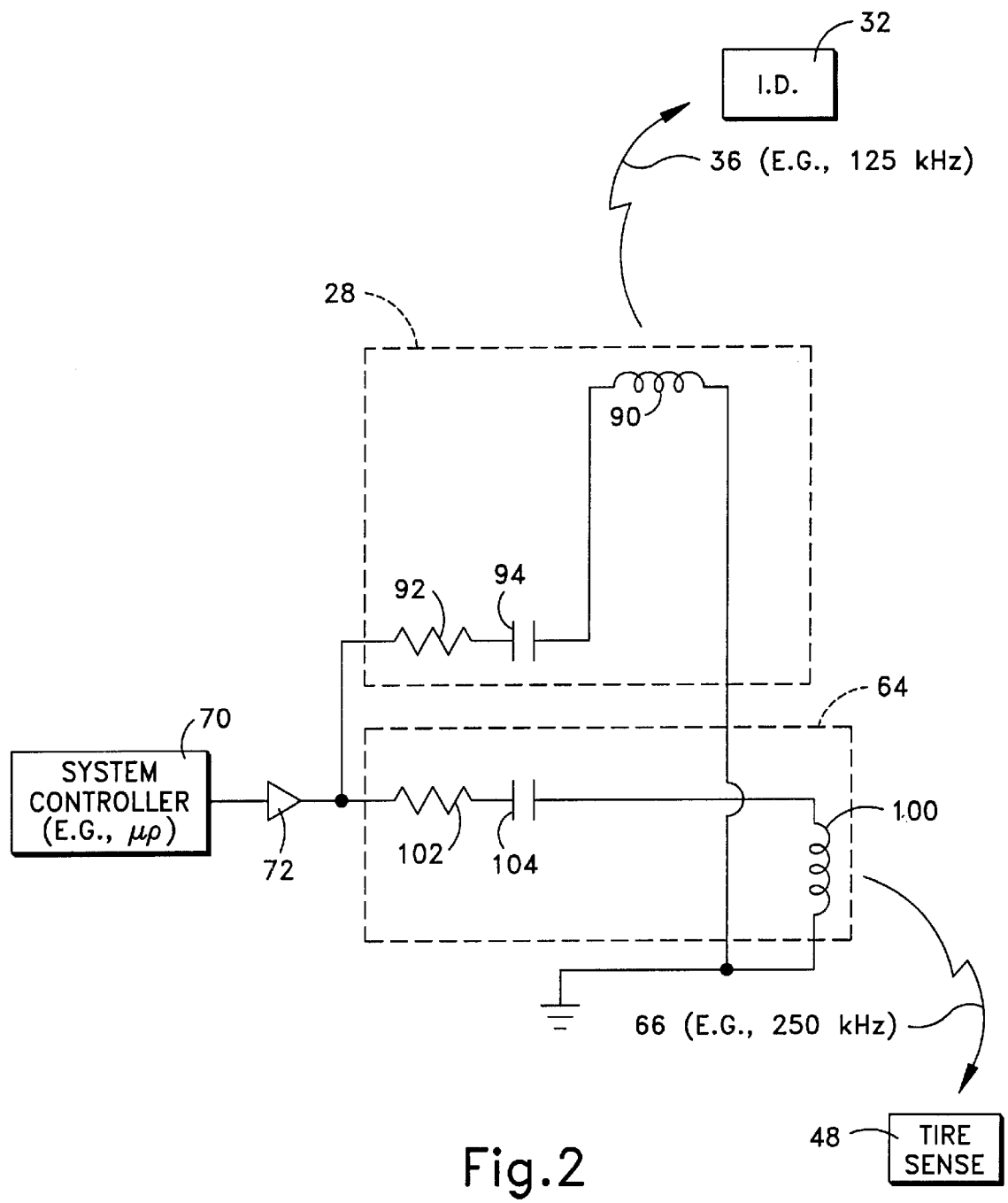
FIG. 2 is schematic diagram of a portion of the communication system of FIG. 1.

FIG. 2 illustrates a portion of an example embodiment of the communication system 10 with the shared component (e.g., the driver 72), in accordance with the present invention. The example is applicable to both the portion of the system 10 identified with a suffix "A" and the portion identified with the suffix "B." As such, FIG. 2 is presented without alphabetic suffixes.

In the example of FIG. 2, the interrogation signal 36 and the initiation signal 66 are both low-frequency, magnetic induction signals. The example shows a single identification transceiver 32, a single tire sensor unit 48, and the vehicle components associated with the interrogation communication and the initiation communication. The driver 72 is a circuit arrangement that is shown in the form of an amplifier operatively connected to the system controller 70.

Signals output from the driver 72 are pulsed signals that have either a first frequency or a second, different frequency. In one specific example, each output signal has a square waveform.

The interrogation transmit component 28 is connected to an output of the driver 72 and the initiate transmit component 64 is connected to the output of the driver. In the illustrated example, the interrogation transmit component 28 and the initiate transmit component 64 are connected in parallel between the driver 72 and electrical ground. Accordingly, the stimulus of the signal output from the driver 72 is applied to interrogation transmit component 28 and the initiate transmit component 64.

The interrogation transmit component 28 includes a first antenna 90 that is stimulated to output the interrogation signal 36. Also, the interrogation transmit component 28 includes a first resistor 92 and a first capacitor 94 connected in series with the first antenna 90 between the driver 72 and ground. Thus, the first resistor 92, the first capacitor 94, and the first antenna 90, which has an inductance, comprise a first RLC circuit that is the interrogation transmit component 28. The first circuit (interrogation transmit component 28) has a relatively high gain or "Q" associated with the first frequency, and relatively little or no gain associated with the second frequency.

The initiate transmit component 64 has a group of elements similar to the components of the interrogation transmit component 28. Specifically, the initiate transmit component 64 includes a second antenna 100, which is stimulated to output the initiation signal 66, a second resistor 102, and a second capacitor 104. The second antenna 100, the second resistor 102, and the second capacitor 104 are connected in series between the driver 72 and ground. The second antenna 100 has an inductance. The initiate transmit component 64 is a second RLC circuit.

One or more of the resistance, capacitance, and/or the inductance values of the initiate transmit component 64 (the second circuit) are different than the respective resistance, capacitance, and/or the inductance values of the interrogate transmit component 28 (the first circuit). The initiate transmit component 64 (the second circuit) has a relatively high gain or "Q" associated with the second frequency, and relatively little or no gain associated with the first frequency.

As mentioned, first and second frequency signals that are output from the driver 72 are applied to both the interrogation transmit component 28 (the first circuit) and the initiate transmit component 64 (the second circuit). However, only a stimulation signal from the driver 72 that has the frequency associated with the high gain of a circuit will cause that circuit to transmit a signal of appreciable strength. In other words, a stimulation signal at the frequency that is associated with little or no gain does not result in a transmitted signal that results in completion of the associated function. Accordingly, only one signal of appreciable strength is sent despite the "sharing" of the driver 72.

Specifically, when the driver 72 outputs a signal at the first frequency, the first antenna 90 of the interrogation transmit component 28 is sufficiently excited to transmit the interrogation signal 36, but the second antenna 100 of the initiate transmit component 64 is not sufficiently excited to transmit any appreciable signal. Thus, the interrogation signal is associated with the first frequency.

When the driver 72 outputs a signal at the second frequency, the antenna 100 of the initiate transmit component 64 is sufficiently excited to transmit the initiation signal 66, but the antenna 90 of the interrogation transmit component 28 is not sufficiently excited to transmit any appreciable signal. Thus, the initiation signal 66 is associated with the second frequency.

Preferably, the interrogation signal 36 and the initiation signal 66 are within a range of relatively low frequencies. Further, the interrogation signal 36 and the initiation signal 66 are preferably provided in the form of magnetic field or magnetic induction signals (e.g., a first frequency at 125 kHz and a second frequency at 250 kHz). Accordingly, in one example, the antennas 90 and 100 are magnetic field induction coils. The identification transceiver 32 and the tire sensor unit 48 each have structure (e.g., antenna) that is appropriate to receive the respective low frequency signal. Of course, it is to be appreciated that the system could be configured differently such that the interrogation signal 36 and the initiation signal 66 are within a different range of frequencies (e.g., the UHF portion of the radio frequency range).

Figure 3:
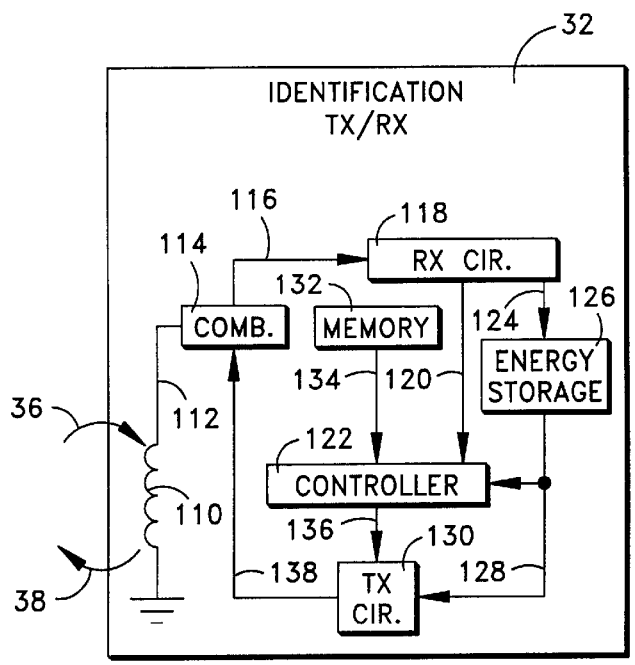
FIG. 3 is a function block diagram of a portable identification unit of the system of FIG. 1.

FIG. 3 schematically illustrates one example of the identification transceiver 32 that is compatible with the example of the components shown in FIG. 2. In the presented example of FIG. 3, the identification transceiver 32 does not include a battery energy source. Energy is transferred to the identification transceiver 32 via the induction coupling.

The induction coupling occurs coincident with interrogation. An antenna 110 (e.g., a coil antenna) is connected 112 to a combiner 114. In turn, the combiner 114 is connected 116 to receive circuitry 118. The receive circuitry 118 is connected 120 to a controller 122 and is connected 124 to an energy storage device 126 (e.g., a capacitor).

In response to the stimulus of the interrogation signal 36, the output of the antenna 110 is provided, via the combiner 114, to the receive circuitry 118. The interrogation request message is provided by the EM receive circuitry 118 to the controller 122. Energy that is derived from the interrogation signal 36 is supplied to the energy storage device 126 from the receive circuitry 118.

The energy storage device 126 is connected 128 to the controller 122 and also to transmit circuitry 130. When energized responsive to the stimulus of the interrogation request, the controller 122 accesses a memory 132 that is connected 134 to the controller to retrieve a security code. The controller 122, which is connected 136 to the transmit circuitry 130, then provides a response message to the transmit circuitry 130. The transmit circuitry 130 is operatively connected 138 to the combiner 114. The transmit circuitry 130 conveys an electrical stimulus signal to the antenna 110 via the combiner 114. In response to the stimulus, the antenna 110 outputs the response signal 38 that conveys the security code, etc.

Of course it is to be appreciated that the identification transceiver 32 and the receive component 30A may be configured differently such that the response signal 38A is a different type (e.g., within the UHF portion of the radio frequency range). If the identification transceiver 32 is configured differently, it may have increased similarities to the tire condition sensor unit 48 of the example of FIG. 4.

Figure 4:
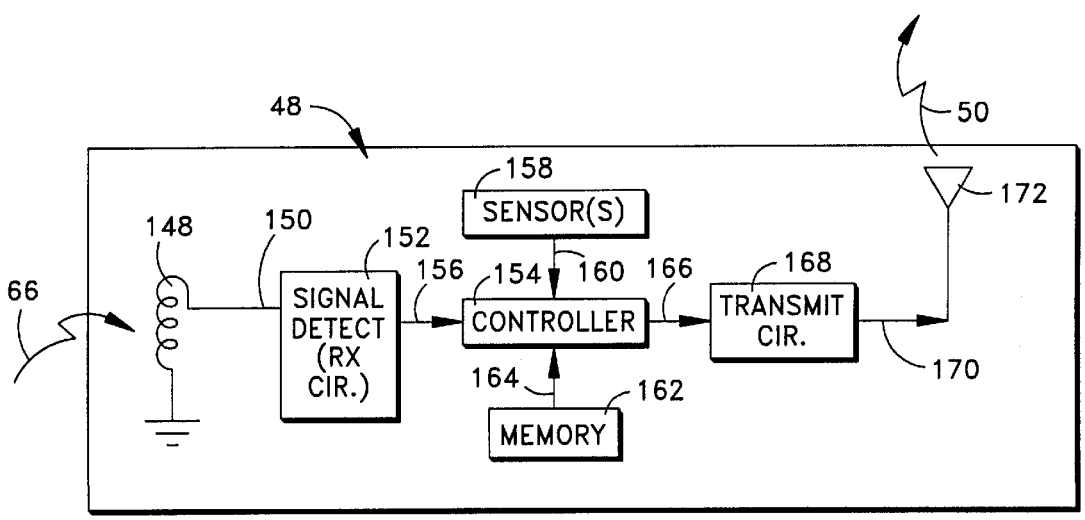
FIG. 4 is a function block diagram of a tire condition sensor unit of the system of FIG. 1.

FIG. 4 schematically illustrates one example of the tire condition sensor unit 48. The example is applicable to all of the tire condition sensor units (e.g., 48A and 48B). Accordingly, FIG. 4 is presented without alphabetic suffixes.

In the illustrated example, a low frequency reception antenna 148 is operatively connected 150 to a low frequency signal detector 152. A controller 154 is operatively connected 156 to the signal detector 152. In response to the signal detector 152 detecting the initiation signal 66, the controller 154 receives sensory information from one or more sensors 158 that are operatively connected 160 to the controller 154.

The controller 154 also receives an identification from an identification memory 162 that is operatively connected 164 to the controller 154. The controller 154 is further operatively connected 166 to transmit circuitry 168. In one example, the communication system 10 is designed to operate with the response signal 50A in the UHF portion of the radio frequency range.

A message packet that contains the sensory information and the identification is assembled by the controller 154 and provided to the transmit circuitry 168. In response to the provided message package, the transmit circuitry 168 provides an electrical stimulus signal, via a connection 170, to an antenna 172 that causes the antenna to output the response signal 50A that conveys the sensory information and the identification. The tire condition sensor unit 48 is powered either via a battery (not shown), or derives energy from the initiation signal 66.

Of course it is to be appreciated that the tire condition sensor unit 48A and the receive component 52 may be configured differently such that the signal 50A is a different type (e.g., within the low frequency range). Further, if the identification transceiver 32 and/or the tire condition sensor unit 48A are configured such that the signals 38 and 50A have the same format (e.g., both at the same frequency within the UHF portion of the radio frequency range), the receive component 30A and the receive component 52 may be combined as a single unit. This provides for additional sharing of components.

Another example of a communication system in accordance with the present invention provides an interrogation signal and an initiation signal via a common driver and a common transmit component (i.e., a common antenna) mounted in a vehicle. The single transmit component (antenna) is stimulated to emit the interrogation signal at the first frequency at a first point in time, and is stimulated to emit the initiation signal at the second frequency at a second point in time. Such frequencies may be 125 and 250 kHz, as previously discussed.

Function of Keyless entry is still independent of the function of monitoring tire condition(s). The identification transceiver (or receiver) is responsive to the first frequency and not the second frequency, and the tire condition sensor unit is responsive to the second frequency and not the first frequency. Thus, each is not affected by the other frequency signal.

From the above description of the invention, those skilled in the art will perceive improvements, changes and modifications. For example, it is to be appreciated that addition/different units and vehicle structures may be provided in another embodiment, with a different sharing arrangement.

Such improvements, changes and modifications within the skill of the art are intended to be covered by the appended claims.

Having described the invention, the following is claimed:

1. A communication system for a vehicle, said system comprising:

a portable identification device for keyless entry into the vehicle, including means for receiving an interrogation signal and means for transmitting an identification indicative signal responsive to the interrogation signal;

a tire sensor device for providing information regarding a condition at a tire of the vehicle, including means for sensing at least one tire condition, means for receiving an initiation signal, and means for transmitting a condition indicative signal responsive to the initiation signal; and a transmitter arrangement for emitting the interrogation signal at a first frequency and the initiation signal at a second, different frequency, said transmitter arrangement including at least one component that is operable for provision of both the interrogation signal at the first frequency and the initiation signal at the second frequency.

2. A system as set forth in claim 1, wherein said component is a transmission driver.

3. A system as set forth in claim 2, wherein said transmitter arrangement includes a first antenna operatively connected to said transmission driver for outputting the interrogation signal at the first frequency when said transmission driver is operated for the first frequency, and a second antenna operatively connected to said transmission driver for outputting the initiation signal at the second frequency when said transmission driver is operated for the second frequency.

4. A system as set forth in claim 3, wherein said first antenna is mounted at location adjacent to an entrance into the vehicle, and said second antenna is mounted at location adjacent to a tire of the vehicle.

5. A system as set forth in claim 3, wherein said first and second antennas are connected in parallel between said transmission driver and electrical ground.

6. A system as set forth in claim 3, wherein said transmission driver outputs electrical energy when said transmission driver is operated for the first or second frequency, said first and second antennas are both subjected to electrical energy during operation of said transmission driver for the first or second frequency.

7. A system as set forth in claim 3, including a first resistor and a first capacitor providing the operative connection of said first antenna to said transmission driver, and a second resistor and a second capacitor providing the operative connection of said second antenna to said transmission driver.

8. A system as set forth in claim 7, wherein said first antenna, said first resistor, and said first capacitor comprise a circuit having a relatively high gain during operation of said transmission driver for the first frequency and having a relatively low gain during operation of said transmission driver for the second frequency, and said second antenna, said second resistor, and said second capacitor comprise a circuit having a relatively high gain during operation of said transmission driver for the second frequency and having a relatively low gain during operation of said transmission driver for the first frequency.

9. A system as set forth in claim 1, including a receiver device for receiving the identification indicative signal and for conveying identification information to an entrance lock control device.

10. A system as set forth in claim 1, wherein said tire sensor device includes memory means for holding a tire identification, said means for transmitting the condition indicative signal include means for transmitting the condition indicative signal to also indicate the tire identification.

11. A system as set forth in claim 1, including a receiver device for receiving the condition indicative signal and for conveying condition information to an indicator.

12. A communication method for a vehicle, said system comprising:

operating at least one component for transmission of an interrogation signal at a first frequency;

receiving the interrogation signal at a portable identification device for keyless entry into the vehicle;

transmitting an identification indicative signal from the portable identification device responsive to the interrogation signal;

operating said at least one component for transmission of an initiation signal at a second, different frequency;

receiving the initiation signal at a tire condition sensor device; and transmitting a condition indicative signal, which is indicative of at least one sensed tire condition, from the tire condition sensor device responsive to the initiation signal.

* * * * *